United States Patent
Lee et al.

(10) Patent No.: US 9,292,912 B2
(45) Date of Patent: Mar. 22, 2016

(54) DISPLAY APPARATUS AND METHOD FOR IMAGE OUTPUT THEREOF

(71) Applicant: SAMSUNG ELECTRONICS CO., LTD., Suwon-si (KR)

(72) Inventors: Sung-ju Lee, Suwon-si (KR); Jung-keun Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 14/078,632

(22) Filed: Nov. 13, 2013

(65) Prior Publication Data

US 2014/0133752 A1 May 15, 2014

(30) Foreign Application Priority Data

Nov. 13, 2012 (KR) .......................... 10-2012-0128286

(51) Int. Cl.
*G06K 9/34* (2006.01)
*G06T 5/40* (2006.01)
*G06T 5/00* (2006.01)

(52) U.S. Cl.
CPC . *G06T 5/40* (2013.01); *G06T 5/008* (2013.01); *G06T 2207/20021* (2013.01)

(58) Field of Classification Search
CPC .......... H04N 21/4316; H04N 21/4318; H04N 21/47202; H04N 5/32; H04N 5/45; H04N 5/57; H04N 5/4401; H04N 5/2258; H04N 5/367; H04N 9/3147; G09G 2320/0626; G09G 2320/0693; G09G 2320/066; G06K 9/34; G06T 5/007; G06T 5/008; G06T 5/40; G06T 2207/20221; G06F 3/14
USPC .......................................................... 382/171
See application file for complete search history.

(56) References Cited

U.S. PATENT DOCUMENTS

| | | | | |
|---|---|---|---|---|
| 6,130,932 | A  * | 10/2000 | Diepstraten | 378/98.7 |
| 6,611,241 | B1 * | 8/2003 | Firester et al. | 345/1.3 |
| 2008/0050034 | A1 * | 2/2008 | Nishida et al. | 382/274 |
| 2008/0297676 | A1 * | 12/2008 | Kimura | 349/39 |

FOREIGN PATENT DOCUMENTS

KR  2001-0033805 A  4/2001

* cited by examiner

*Primary Examiner* — Ali Bayat
(74) *Attorney, Agent, or Firm* — Sughrue Mion, PLLC

(57) ABSTRACT

A display apparatus and an image output method thereof are provided. The image output method includes dividing a received image into a plurality of sub-images, correcting quality of each of the sub-images based on a contrast ratio calculated for the received image, and outputting the image by combining the corrected sub-images. Hence, the display apparatus can enhance luminance and chrominance which vary per sub-image segment in the received image.

16 Claims, 4 Drawing Sheets

DISPLAY APPARATUS AND METHOD FOR IMAGE OUTPUT THEREOF

CROSS-REFERENCE TO RELATED APPLICATIONS

This application claims from Korean Patent Application No. 2012-0128286 filed on Nov. 13, 2012 in the Korean Intellectual Property Office, the entire disclosure of which is incorporated herein by reference.

BACKGROUND

1. Field

Apparatuses and methods consistent with exemplary embodiments generally relate to a display apparatus and an image output method thereof. In particular, the present general inventive concept relates to a display apparatus and an image output method for improving quality of a received image.

2. Description of the Related Art

Various image processing methods are developed to enhance quality of an image displayed by a display device. In general, when an image is input from the outside, the display device segments the input image into a plurality of sub-images and determines a contrast ratio of the segmented sub-image. When the contrast ratios of the sub-images of the input image are determined, the display device adjusts backlight brightness per sub-image based on the determined contrast ratio of the sub-image.

For example, among the segmented sub-images, the overall brightness of the first sub-image can be high and the overall brightness of the second sub-image can be low. In this case, the contrast ratio of the first sub-image can be determined for a very high brightness, and the contrast ratio of the second sub-image can be determined for a very low brightness. As such, when the contrast ratio of each segmented sub-image is determined, the display device differently controls the backlight per sub-image based on the determined contrast ratio.

Hence, when the sub-images are displayed as the single image on a screen, luminance and color of the corresponding image are not even.

SUMMARY

The present general inventive concept has been provided to address the above-mentioned and other problems and disadvantages occurring in the conventional arrangement, and an aspect of the present general inventive concept is to enhance image quality adjustment of a received image. However, an exemplary embodiment may not address the above-mentioned and other problems and disadvantages occurring in the conventional arrangement.

According to an aspect of the present general inventive concept, an image output method includes dividing a received first image into a plurality of sub-images; correcting quality of each of the sub-images based on a contrast ratio calculated for the received first image; and outputting a second image by combining the corrected sub-images.

The image output method may further include determining whether to calculate a contrast ratio of the received first image; and calculating the contrast ratio of the received first image based on the determination. When determining to calculate the contrast ratio of the received first image, the calculating operation may precede the operation for dividing the received image into the plurality of the sub-images.

When determining not to calculate the contrast ratio of the received first image, the calculating operation may calculate the contrast ratio of each of the segmented plurality of sub-images.

The calculating operation may calculate a mean value of the calculated contrast ratios of the each of the plurality of sub-images.

The operation for calculating the contrast ratio may calculate the contrast ratio of the first image based on a histogram indicating brightness of pixels of the first image.

The operation for determining whether to calculate the contrast ratio of the received first image may comprise determining whether to calculate the contrast ratio based on at least one from an input command and a feature of the received first image.

The image output method may further include adjusting the calculated contrast ratio of at least one sub-image corresponding to the command among the plurality of the divided sub-images.

A display apparatus includes a display; an image divider configured to divide a received first image into a plurality of sub-images; an image processor configured to correct a quality of each of the plurality of sub-images based on a contrast ratio calculated for the received first image; and a controller configured to control the display to output a second image by combining the corrected sub-images.

The display apparatus may further include a contrast ratio calculator configured to calculate a contrast ratio of the received first image. The controller may determine whether to calculate the contrast ratio of the received first image, and when determining to calculate the contrast ratio of the received first image, control the contrast ratio calculator to calculate the contrast ratio of the received first image.

When determining not to calculate the contrast ratio of the received first image, the controller may control the contrast ratio calculator to calculate the contrast ratio of each of the plurality of sub-images.

The controller may control the contrast ratio calculator to calculate a mean value of the calculated contrast ratios of the each of the plurality of sub-images.

The contrast ratio calculator may calculate the contrast ratio of the first image based on a histogram indicating brightness of pixels of the first image.

The display apparatus may further include an inputter configured to receive a command; and a storage which stores setup information to determine whether to calculate the contrast ratio according to a feature of the image. The controller may determine whether to calculate the contrast ratio of the received first image based on at least one from among the command which is input through the inputter and the setup information stored in the storage.

The controller may adjust the calculated contrast ratio of at least one sub-image corresponding to the command among the plurality of the divided sub-images.

As set forth above; the display apparatus can correct the quality of the sub-images segmented from the received image based on the total contrast ratio of the received image, and thus enhance luminance and chrominance which vary according to the segmented sub-image.

BRIEF DESCRIPTION OF THE DRAWING FIGURES

These and/or other aspects and advantages of the present general inventive concept will become apparent and more readily appreciated from the following description of the exemplary embodiments, taken in conjunction with the accompanying drawings of which:

DETAILED DESCRIPTION OF THE EXEMPLARY EMBODIMENTS

Figure 1:
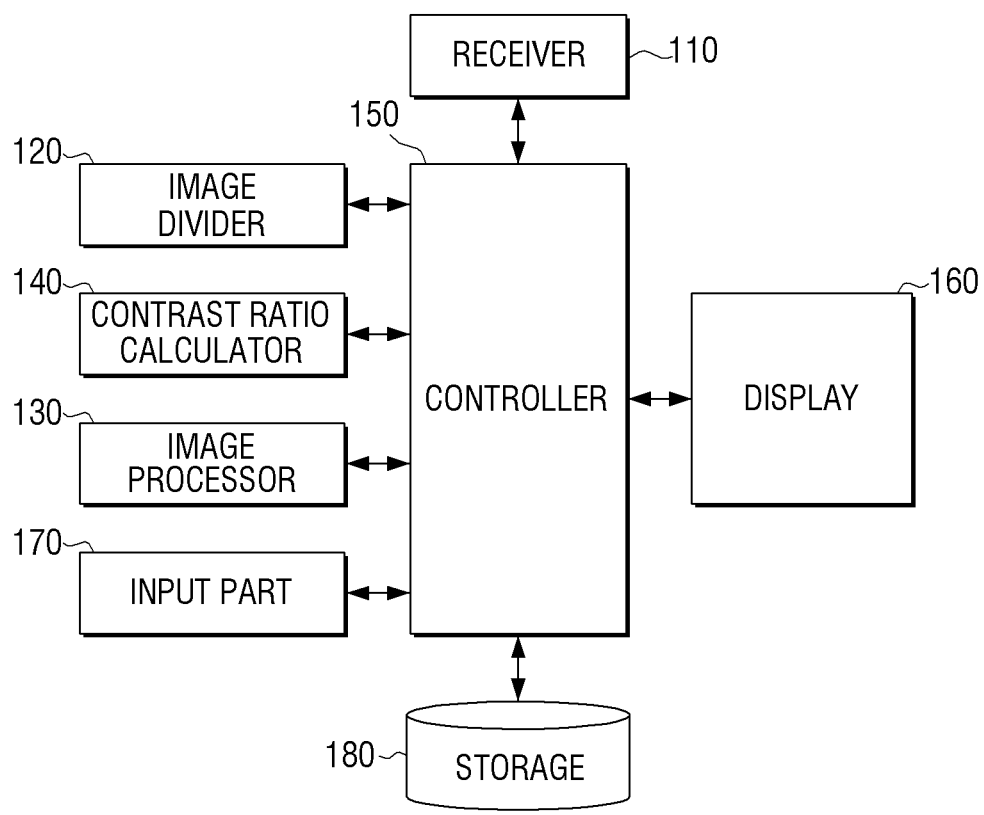
FIG. 1 is a block diagram of a display apparatus according to an exemplary embodiment.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the drawings.

FIG. 1 is a block diagram of a display apparatus according to an exemplary embodiment of the present general inventive concept.

As shown in FIG. 1, the display apparatus includes a receiver 110, an image divider 120, an image processor 130, a contrast ratio calculator 140, a controller 150, and a display 160.

The receiver 110 receives an image from an external server or an external device. In detail, the receiver 110 can communicate data with the external server via a wired or wireless communication module and thus receive the image from the external server. The receiver 110 can receive the image from the external server through a network interface card module, or through the external device being a recording medium of various types such as compact disc (CD), digital versatile disc (DVD), hard disc, Blueray disc, memory card, and universal serial bus (USB) memory.

When receiving the image at the receiver 110, the image divider 120 segments the received image into a plurality of sub-images. For example, when a 2-megabyte image is received through the receiver 110, the image divider 120 can segment the received 2-megabyte image to four 0.5-megabyte sub-images. The segmentation of the received image into the sub-images is well known in the related art and thus shall be omitted here. Meanwhile, the image processor 130 corrects quality of each sub-image segmented by the image divider 120 based on a contrast ratio calculated for the image received through the receiver 110. The controller 150 controls the components of the display apparatus. In particular, the controller 150 controls the display 160 to combine and output the sub-images corrected by the image processor 130. Thus, the display 150 can output the image of the corrected quality.

Meanwhile, the contrast ratio used to correct the quality of the sub-images in the image processor 130 can be calculated by the contrast ratio calculator 140. The contrast ratio calculator 140 calculates the contrast ratio of the image received through the receiver 110. According to a control command of the controller 150, the contrast ratio calculator 140 can calculate the contrast ratio of the received image (hereafter, referred to as a total contrast ratio) or the contrast ratio of each sub-image divided from the received image (hereafter, referred to as a sub contrast ratio). That is, the contrast ratio calculator 140 can calculate the total contrast ratio of the received image or the sub contrast ratio of each segmented sub-image, based on a histogram indicating brightness of pixels of the received image.

To calculate the total contrast ratio of the received image, the contrast ratio calculator 140 calculates a gray level distribution by analyzing a signal level, that is, a luminance component of the received image. Next, the contrast ratio calculator 140 calculates a mean value of the received image based on the gray level distribution calculated from the received image. Hence, the calculated mean value can be determined as the total contrast ratio of the received image.

To calculate the sub contrast ratios of the sub-images segmented from the received image, the contrast ratio calculator 140 calculates a gray level distribution of each sub image by analyzing a signal level, that is, a luminance component of the sub-image segmented from the received image. Next, the contrast ratio calculator 140 calculates a mean value of the segmented sub-images based on the gray level distribution calculated from the segmented sub-images. Hence, the calculated mean value of the sub-images can be determined as the sub contrast ratio of the sub-images.

As such, the contrast ratio calculator 140 can calculate the total contrast ratio of the received image or the contrast ratio of the sub-images segmented from the received image according to the control command of the controller 150. The controller 150, which controls the contrast ratio calculator 140, can determine whether to calculate the total contrast ratio of the received image, and control the contrast ratio calculator 140 according to the determination.

That is, when determining whether to calculate the total contrast ratio of the received image and determining to calculate the total contrast ratio of the received image, the controller 150 can control the contrast ratio calculator 140 to calculate the total contrast ratio of the received image. In detail, the controller 150 can determine whether to calculate the total contrast ratio of the received image, according to a user command relating to the total contrast ratio calculation of the received image or a feature of the received image. For doing so, the display apparatus can further include an input part 170 for receiving the user command, and a storage 180. Herein, the storage 180 stores setup information to determine whether to calculate the total contrast ratio according to the image feature. Herein, the image feature can include an image size. For example, when the received image size is smaller than 2 megabytes, the total contrast ratio of the received image is calculated.

Accordingly, when the user inputs the user command relating to the total contrast ratio calculation of the image through the input part 170 or when the received image size is smaller than a preset image size, the controller 150 can determine to calculate the total contrast ratio of the received image. According to such determination, the controller 150 controls the contrast ratio calculator 140 to calculate the total contrast ratio of the received image. According to the control command, the contrast ratio calculator 140 can calculate the total contrast ratio of the received image based on the gray level distribution calculated from the received image as described above.

When the total contrast ratio of the received image is calculated, the image processor 130 corrects the quality of the sub-images based on the calculated total contrast ratio. Next, the controller 150 controls the display 160 to combine the sub-images corrected based on the total contrast ratio and to output one single image of the sub-images. Hence, the display 160 can output the image with the quality corrected based on the total contrast ratio.

Meanwhile, when the user inputs the user command relating to the sub contrast ratio calculation of the segmented image through the input part 170 or when the received image size exceeds the preset image size, the controller 150 can determine to calculate the sub contrast ratios of the segmented sub-images of the received image. According to the determination, the controller 150 controls the contrast ratio calculator 140 to calculate the sub contrast ratios of the segmented sub-images of the received image. According to such a control command, the contrast ratio calculator 140 can calculate the sub contrast ratio of each sub-image based on the gray level distribution calculated from the sub-images segmented by the image divider 120.

When the sub contrast ratios of the segmented sub-images of the received image are calculated, the image processor 130 corrects the quality of the sub-images based on the calculated sub contrast ratios. Next, the controller 150 controls the display 160 to combine the sub-images corrected based on the sub contrast ratios and to output one single image of the sub-images. Hence, the display 160 can output the image corrected based on the sub contrast ratios calculated per sub-image.

Meanwhile, when the contrast ratio calculator 140 calculates the sub contrast ratio of each sub-image, the controller 150 can control to calculate the mean value of the calculated sub contrast ratios. According to such a control command, the contrast ratio calculator 140 can calculate the sub contrast ratio of each sub-image segmented from the received image and then calculate the mean values of the calculated sub contrast ratios. Hence, the mean value calculated from the sub contrast ratios can be determined as the contrast ratio to apply to each individual sub-image. For example, when the sub contrast ratios of first through fourth segmented sub-images of the received image are 30, 50, 10 and 20 respectively, the mean value of the sub contrast ratios can be 27.5.

As above, when the mean value of the sub contrast ratios of the sub-images segmented from the received image is calculated, the image processor 130 corrects the quality of the sub-images based on the calculated mean value. Next, the controller 150 controls the display 160 to combine the sub-images corrected based on the mean value and to output one single image of the sub-images. Hence, the display 160 can output the image corrected based on the mean value calculated from the sub contrast ratios of the segmented sub-images of the received image.

In addition, the controller 150 can correct the calculated contrast ratio of at least one sub-image corresponding to the user command among the plurality of the sub-images segmented from the received image. When one of the total contrast ratio, the sub contrast ratio, and the mean value is calculated, a contrast ratio control command for at least one of the segmented sub-images can be input through the input part 170. In this case, the controller 150 can correct the contrast ratio of at least one sub-image corresponding to the contrast ratio control command which is input through the input part 170. For example, the total contrast ratio is calculated, the received image is divided into first through fourth sub-images, and the contrast ratio control command is input for the first sub-image of the four segmented images. In this case, the controller 150 controls the image processor 130 to correct the quality of the second, third, and fourth sub-images of the four sub-images based on the calculated total contrast ratio. The controller 150 adjusts the calculated total contrast ratio with the contrast ratio corresponding to the input contrast ratio control command, and controls the image processor 130 to correct the quality of the first sub-image based on the corrected contrast ratio. According to such a control command, the image processor 130 can correct the quality of the second, third, and fourth sub-images of the four sub-images based on the calculated total contrast ratio, and correct the first sub-image quality based on the corrected contrast ratio.

So far, the components of the display apparatus have been explained in detail. Hereafter, the quality adjustment of the received image in the display apparatus is described.

Figure 2:
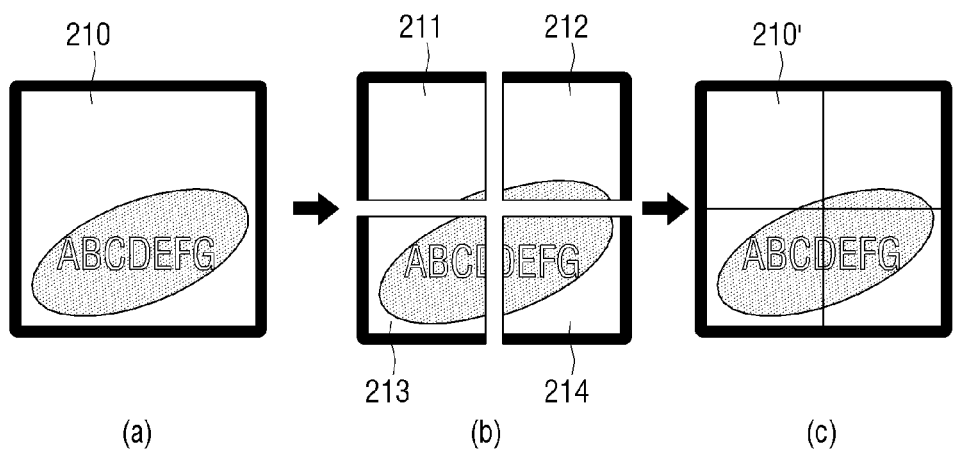
FIG. 2 is a diagram of quality adjustment of a received image in the display apparatus according to an exemplary embodiment.

FIG. 2 is a diagram of the quality adjustment of the received image in the display apparatus according to an exemplary embodiment of the present general inventive concept.

As shown in (a), the display apparatus can receive an image 210 including a logo 'ABCDEFG' through the receiver 110. Upon receiving the image 210, the controller 130 determines whether to calculate the total contrast ratio of the received image 210. As aforementioned, the controller 130 can determine whether to calculate the total contrast ratio of the received image 210 according to the user command regarding the total contrast ratio calculation or a preset condition. To calculate the total contrast ratio according to the determination, the contrast ratio calculator 140 calculates the total contrast ratio of the received image 210 based on the histogram indicating the brightness of pixels of the received image 210. Next, the image divider 120 segments the received image 210 to first through fourth sub-images 211 through 214 as shown in (b) of FIG. 2. The image processor 130 corrects the quality of the first through fourth sub-images 211 through 214 based on the total contrast ratio calculated by the contrast ratio calculator 140. Next, the controller 150 combines the first through fourth sub-images 211 through 214 corrected based on the total contrast ratio. Hence, the display 160 can output the first through fourth sub-images 211 through 214 corrected based on the total contrast ratio, as the single image 210'.

To calculate the sub contrast ratio of the segmented sub-image according to the determination, the image divider 120 segments the received image 210 to the first through fourth sub-images 211 through 214 as shown in (b) of FIG. 2. Next, the contrast ratio calculator 140 calculates the sub contrast ratio of each of the first through fourth sub-images 211 through 214 based on the histogram indicating the brightness of the pixels of the first through fourth sub-images 211 through 214 segmented from the received image 210. Next, the image processor 130 corrects the quality of the first through fourth sub-images 211 through 214 based on the sub contrast ratios calculated by the contrast ratio calculator 140. Next, the controller 150 combines the first through fourth sub-images 211 through 214 corrected based on the sub contrast ratios. Hence, the display 160 can output the first through fourth sub-images 211 through 214 corrected based on the sub contrast ratios, as the single image 210'.

Meanwhile, according to the user command, the controller 150 can correct the total contrast ratio or the sub contrast ratio to apply to at least one of the first through fourth sub-images 211 through 214 segmented from the single image 210. For example, when the total contrast ratio of the received image 210 is calculated, the contrast ratio control command for the first sub-image 211 can be input. In this case, the controller 150 corrects the total contrast ratio to apply to the first sub-image 211 with the contrast ratio corresponding to the contrast ratio control command which is input from the user. When the contrast ratio to apply to the first sub-image 211 is corrected, the image processor 130 can correct the quality of the second, third, and fourth sub-images 212, 213 and 214 of the four sub-images 211 through 214 based on the total contrast ratio, and correct the quality of the first sub-image 211 based on the corrected contrast ratio, so as to output them as the singe image 210'. As a result, the display 160 can output the second, third, and fourth sub-images 212, 213 and 214 corrected based on the total contrast ratio and the first sub-image 211 corrected based on the connected contrast ratio, as the single image 210'.

So far, the operations of the display apparatus for correcting and outputting the quality of the received image have been illustrated in detail. Now, a method for correcting and outputting the received image quality in the display apparatus is elucidated.

Figure 3:
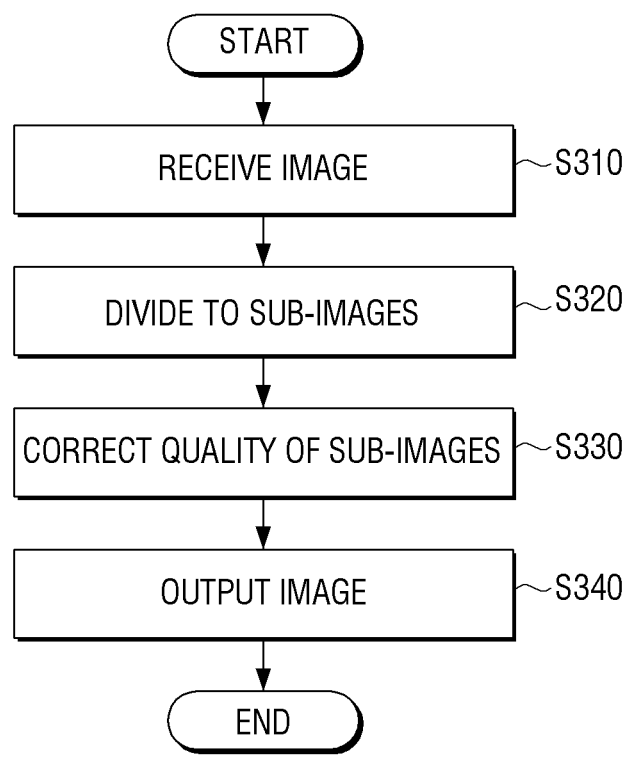
FIG. 3 is a flowchart of an image output method in the display apparatus according to an exemplary embodiment.

FIG. 3 is a flowchart of an image output method in the display apparatus according to an embodiment of the present general inventive concept.

As shown in FIG. 3, the display apparatus receives the image from the external server or the external device (S310). Upon receiving the image, the display apparatus segments the received image into the plurality of the sub-images (S320). For example, when the received image is a 2-megabyte image, the display apparatus can segment the 2-megabyte image into four 0.5-megabyte sub-images. Next, the display apparatus corrects the quality of each sub-image based on the contrast ratio calculated for the received image (S330). In detail, the display apparatus can determine whether to calculate the total contrast ratio of the received image, and then calculate the total contrast ratio of the received image or the sub contrast ratio of each sub-image according to the determination. The calculation of the total contrast ratio of the received image or the sub contrast ratio of each sub-image according to the determination shall be explained by referring to FIG. 4.

When calculating the total contrast ratio of the received image or the sub contrast ratio of each sub-image segmented from the received image, the display apparatus corrects the quality of the segmented sub-images based on the calculated total contrast ratio or sub contrast ratios. Next, the display apparatus outputs the single image by combining the connected sub-images (S340). Thus, the display apparatus can output the corrected image of the received image.

So far, the method for outputting the corrected image by applying the calculated contrast ratio to the received image in the display apparatus has been explained in brief. Hereafter, the method for correcting the quality of each sub-image segmented from the received image in the display apparatus is explained in detail.

Figure 4:
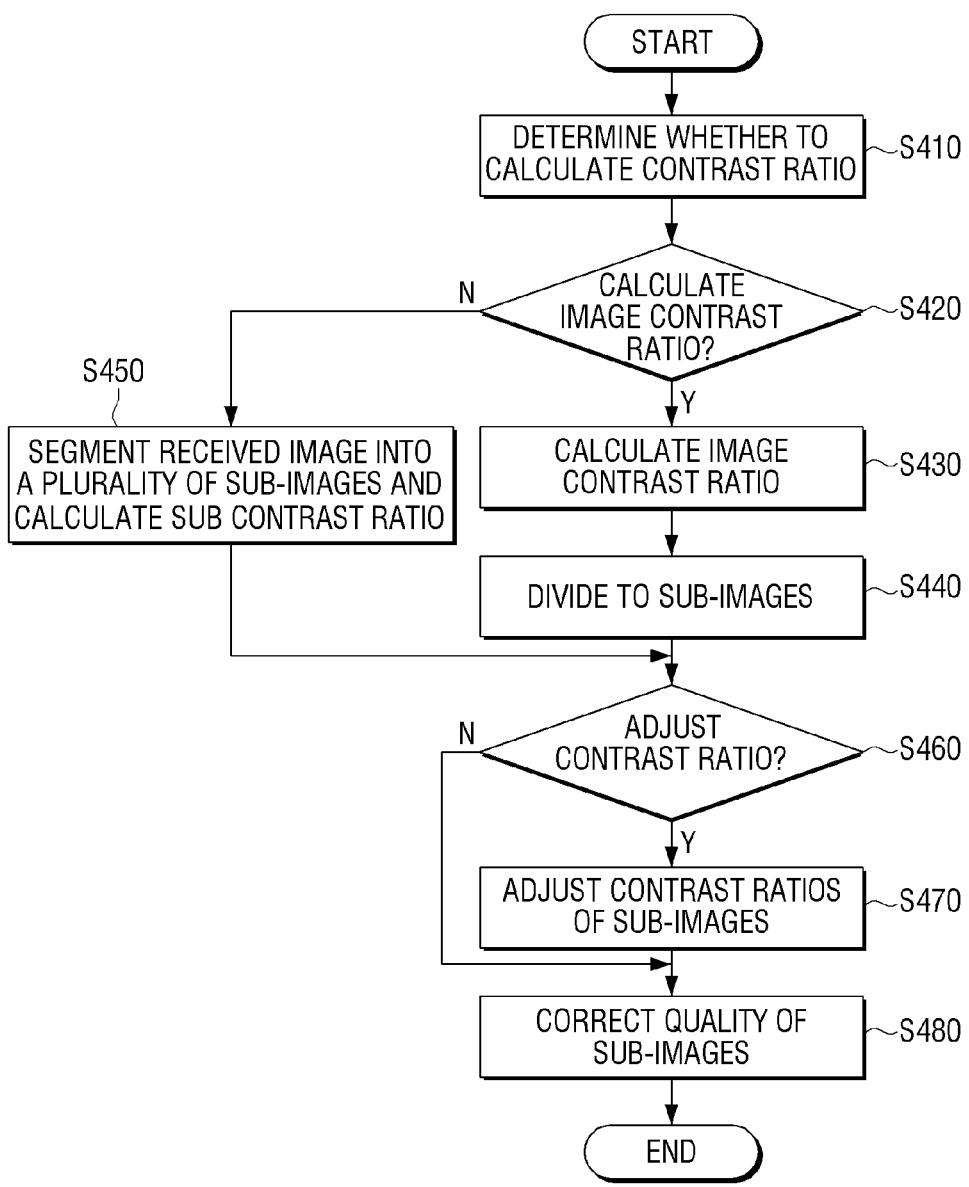
FIG. 4 is a flowchart of an image quality correction method in the display apparatus according to an exemplary embodiment.

FIG. 4 is a flowchart of the image quality adjustment method in the display apparatus according to an exemplary embodiment of the present general inventive concept.

As shown in FIG. 4, upon receiving the image from the external server or the external device, the display apparatus determines whether to calculate the total contrast ratio of the received image (S410). In detail, the controller 150 can determine whether to calculate the total contrast ratio of the received image, based on the input user command or a feature of the received image. Herein, the user command can pertain to the total contrast ratio calculation of the received image. The display apparatus can prestore the setup information to determine whether to calculate the total contrast ratio according to the image feature. Herein, the image feature can include the image size. For example, the total contrast ratio of the received image can be calculated only when the received image size is smaller than 2 megabytes.

Hence, when the user inputs the user command relating to the total contrast ratio calculation of the received image or when the received image size is smaller than a preset image size, the display apparatus can determine to calculate the total contrast ratio of the received image. According to the determination, the display apparatus calculates the total contrast ratio of the received image (S420 and S430). Next, the display apparatus segments the received image into the plurality of the sub-images (S440). Meanwhile, when determining not to calculate the total contrast ratio of the received image, the display apparatus segments the received image into the plurality of the sub-images, and then calculates the sub contrast ratio of each segmented images (S450).

As stated earlier, according to the determination, the display apparatus, which calculates the total contrast ratio of the received image or the sub contrast ratio of each segmented sub-image of the received image, can calculate the contrast ratio of the received image based on the histogram indicating the brightness of the pixels of the received image. More specifically, to calculate the total contrast ratio of the received image, the display apparatus calculates the gray level distribution by analyzing the signal level, that is, the luminance component of the received image. Next, the display apparatus calculates the mean value of the received image based on the gray level distribution calculated from the received image. Hence, the calculated mean value can be determined as the total contrast ratio of the received image.

To calculate the sub contrast ratio of each segmented sub-image of the received image, the display apparatus calculates the gray level distribution of each sub image by analyzing the signal level, that is, the luminance component of the segmented sub-image of the received image. Next, the display apparatus calculates the mean value of the segmented sub-images based on the gray level distribution calculated from the segmented sub-images. Hence, the calculated mean value of the sub-images can be determined as the sub contrast ratio of the sub-images.

Meanwhile, when calculating the sub contrast ratio of each sub-image, the display apparatus can calculate the mean value of the calculated sub contrast ratios. The mean value calculated from the sub contrast ratios can be determined as the sub contrast ratio to apply to the sub-images.

As such, upon determining the contrast ratio to apply to the segmented sub-images of the received image, the display apparatus determines whether the user inputs the contrast ratio control command relating to the calculated contrast ratio (S460). When the contrast ratio control command is input, the display apparatus corrects the calculated contrast ratio of at least one sub-image corresponding to the contrast ratio control command among the segmented sub-images of the received image (S470). Next, the display apparatus corrects the quality of the sub-images based on the calculated contrast ratio and the corrected contrast (S480).

As aforementioned, the display apparatus can calculate the total contrast ratio of the received image or the sub contrast ratio of each segmented image of the received image in S430 or S450. In addition, the display apparatus can calculate the mean value of the calculated sub contrast ratios. As such, when one of the total contrast ratio, the sub contrast ratio, and the mean value is calculated and the contrast ratio control command for at least one of the segmented sub-images is input, the display apparatus can correct the contrast ratio of the sub-image corresponding to the input contrast ratio control command.

For example, when the total contrast ratio of the received image is calculated and the received image is divided into the first through fourth sub-images, the contrast ratio control command can be input for the first sub-image of the four segmented images. In this case, the display apparatus corrects the quality of the second, third, and fourth sub-images of the four sub-images based on the calculated total contrast ratio. The display apparatus can adjust the total contrast ratio to apply to the first sub-image with the contrast ratio corresponding to the contrast ratio control command which is input from the user, and correct the quality of the first sub-image based on the corrected contrast ratio.

Meanwhile, when the user does not input the contrast ratio control command, the display apparatus can correct the quality of each sub-image using one of the total contrast ratio, the sub contrast ratio of each segmented sub-image, and the mean value of the sub contrast ratios in S480.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An image output method comprising:
    determining whether to calculate a contrast ratio of a received first image;
    when determining to calculate the contrast ratio of the received first image, calculating the contrast ratio of the received first image;
    dividing the received first image into a plurality of sub-images;
    correcting quality of each of the sub-images based on the contrast ratio calculated for the received first image; and
    outputting a second image by combining the corrected sub-images.

2. The image output method of claim 1, wherein, when determining not to calculate the contrast ratio of the received first image, the calculating operation calculates the contrast ratio of each of the segmented plurality of sub-images.

3. The image output method of claim 2, wherein the calculating operation calculates a mean value of the calculated contrast ratios of the each of the plurality of sub-images.

4. The image output method of claim 1, wherein the operation for calculating the contrast ratio calculates the contrast ratio of the first image based on a histogram indicating brightness of pixels of the first image.

5. The image output method of claim 1, wherein the operation for determining whether to calculate the contrast ratio of the received first image comprises determining whether to calculate the contrast ratio based on at least one from an input command and a feature of the received first image.

6. The image output method of claim 5, further comprising:
    adjusting the calculated contrast ratio of at least one sub-image corresponding to the user command among the plurality of the divided sub-images.

7. A display apparatus comprising:
    a display;
    an image divider configured to divide a received first image into a plurality of sub-images;
    a contrast ratio calculator configured to calculate a contrast ratio of the received first image,
    an image processor configured to correct a quality of each of the plurality of sub-images based on the contrast ratio calculated for the received first image; and
    a controller configured to control the display to output a second image by combining the corrected sub-images,
    wherein the controller determines whether to calculate the contrast ratio of the received first image, and when determining to calculate the contrast ratio of the received first image, controls the contrast ratio calculator to calculate the contrast ratio of the received first image.

8. The display apparatus of claim 7, wherein, when determining not to calculate the contrast ratio of the received first image, the controller controls the contrast ratio calculator to calculate the contrast ratio of each of the plurality of sub-images.

9. The display apparatus of claim 8, wherein the controller controls the contrast ratio calculator to calculate a mean value of the calculated contrast ratios of the each of the plurality of sub-images.

10. The display apparatus of claim 7, wherein the contrast ratio calculator calculates the contrast ratio of the first image based on a histogram indicating brightness of pixels of the first image.

11. The display apparatus of claim 7, further comprising:
    an inputter configured to receive a command; and
    a storage which stores setup information to determine whether to calculate the contrast ratio according to a feature of the image,
    wherein the controller determines whether to calculate the contrast ratio of the received first image based on at least one from among the command which is input through the inputter and the setup information stored in the storage.

12. The display apparatus of claim 7, wherein the controller adjusts the calculated contrast ratio of at least one sub-image corresponding to the command among the plurality of the divided sub-images.

13. An image output method comprising:
    dividing a received first image into a plurality of sub-images;
    correcting quality of each of the plurality of sub-images based on a contrast ratio; and
    outputting a second image by combining the corrected plurality of sub-images,
    wherein the quality of at least one of the plurality of sub-images is corrected based on a calculated total contrast ratio of the received first image, and the quality of another one of the plurality of sub-images is based on a corrected contrast ratio.

14. The method of claim 13, wherein the corrected contrast ratio is input by a user.

15. A display apparatus comprising:
    a display;
    an image divider configured to divide a received first image into a plurality of sub-images;
    an image processor configured to correct a quality of each of the plurality of sub-images; and
    a controller configured to control the display to output a second image by combining the corrected plurality of sub-images,
    wherein the quality of at least one of the plurality of sub-images is corrected based on a calculated total contrast ratio of the received first image, and the quality of another one of the plurality of sub-images is based on a corrected contrast ratio.

16. The apparatus of claim 15, wherein the corrected contrast ratio is input by a user.

* * * * *